(12) United States Patent
Busse et al.

(10) Patent No.: US 9,614,303 B2
(45) Date of Patent: Apr. 4, 2017

(54) PLUG CONNECTOR HOUSING

(71) Applicant: HARTING Electric GmbH & Co. KG, Espelkamp (DE)

(72) Inventors: Reiner Busse, Bielefeld (DE); Andreas Rueter, Rahden (DE)

(73) Assignee: HARTING ELECTRIC GMBH & CO. KG (DE)

( * ) Notice: Subject to any disclaimer, the term of this patent is extended or adjusted under 35 U.S.C. 154(b) by 0 days.

(21) Appl. No.: 14/904,858

(22) PCT Filed: Sep. 3, 2014

(86) PCT No.: PCT/DE2014/100316
§ 371 (c)(1),
(2) Date: Jan. 13, 2016

(87) PCT Pub. No.: WO2015/032388
PCT Pub. Date: Mar. 12, 2015

(65) Prior Publication Data
US 2016/0181708 A1   Jun. 23, 2016

(30) Foreign Application Priority Data
Sep. 4, 2013   (DE) .......................... 10 2013 109 653

(51) Int. Cl.
*H01R 4/60* (2006.01)
*H01R 43/18* (2006.01)
(Continued)

(52) U.S. Cl.
CPC .............. *H01R 4/60* (2013.01); *G02B 6/3894* (2013.01); *H01R 13/502* (2013.01);
(Continued)

(58) Field of Classification Search
CPC ....... H01R 4/60; H01R 13/502; G02B 6/3894
See application file for complete search history.

(56) References Cited

U.S. PATENT DOCUMENTS

| 5,043,536 A * | 8/1991 | DeBartolo, Jr. ....... H02G 3/085 174/666 |
| 7,109,415 B2 * | 9/2006 | Neitzel ................. H02G 3/085 174/50 |
| 2010/0122826 A1 | 5/2010 | de la Borbolla ................ 174/54 |

FOREIGN PATENT DOCUMENTS

| DE | 93 12 476 | 12/1993 | ............... H02G 3/18 |
| EP | 0 546 637 | 6/1993 | ............... H02G 3/18 |
| NL | EP 0546637 B1 * | 8/1995 | ........... H02G 3/0675 |

OTHER PUBLICATIONS

German Search report issued in corresponding German Patent Appln. No. 10 2013 109 653.0 dated Apr. 28, 2014 (1 pg).
(Continued)

*Primary Examiner* — William H Mayo, III
*Assistant Examiner* — Hiram E Gonzales
(74) *Attorney, Agent, or Firm* — Hayes Soloway P.C.

(57) ABSTRACT

Provided is a plug connector housing for protecting a plug connector. The housing has at least one pre-equipped cable outlet for connecting a threaded cable connection and at least one closure for closing the at least one cable outlet. The at least one cable outlet has a thread which forms a screw channel and the plug connector housing has a predetermined breaking point in the transition region to the closure. Also provided is a method for opening a cable outlet of a plug connector housing.

13 Claims, 8 Drawing Sheets

(51) Int. Cl.
G02B 6/38 (2006.01)
H01R 43/00 (2006.01)
H01R 13/52 (2006.01)
H01R 13/502 (2006.01)
H01R 43/22 (2006.01)
H02G 3/08 (2006.01)

(52) U.S. Cl.
CPC ........... *H01R 13/52* (2013.01); *H01R 43/005* (2013.01); *H01R 43/18* (2013.01); *H01R 43/22* (2013.01); *H02G 3/085* (2013.01)

(56) References Cited

OTHER PUBLICATIONS

International Search Report issued in corresponding PCT Patent Appln. No. PCT/DE2014/100316, dated Jan. 9, 2015, with English translation (5 pgs).
International Preliminary Report on Patentability issued in corresponding PCT Patent Appln. No. PCT/DE2014/100316, dated Sep. 16, 2016, (7 pgs).

\* cited by examiner

PLUG CONNECTOR HOUSING

BACKGROUND OF THE INVENTION

The invention relates to a plug connector housing for protecting a plug connector, and to a method for opening a cable outlet of a plug connector housing.

Plug connectors are used to separate and connect lines, which in particular are designed to conduct electrical current or optical radiation. Plug connectors of this type usually have a plug connector housing, into which a threaded cable connector can be introduced. Here, the plug connector housings are designed in such a way that they have a screw channel, into which the threaded cable connector is screwed. This screw channel is formed by what is known as a cable outlet. This cable outlet is usually opened to the interior of the housing or is closed by a cover, in particular by what is known as a blind cover. In the case of an opened cable outlet it is disadvantageous that contaminations may infiltrate the cable outlets and may thus lead to a disruption of the cable function. In the event of excessive contamination, the cable may consequently be damaged. If the cable outlet is closed by a cover it is disadvantageous that this cover has to be detached prior to insertion of the threaded cable connector. This is usually very complex and complicated, since, for example in the case of smaller plug connector housings or plug connector housings that are difficult to access, it is not possible to screw on said cover by hand. A special tool must therefore be used in order to screw on covers of this type.

It is also known that the opening between the interior of the plug connector housing and the cable outlet is not detachably closed, for example by a housing wall. Here, prior to the mounting of the threaded cable connector, a tool must be used in order to reach an opening between cable outlet and the interior of the plug connector housing. Here, such an opening is usually drilled out by means of a drill. Here as well, the use of a tool is thus necessary and therefore leads to a high level of effort, and in particular also leads to a large expenditure of time when assembling a number of plug connector housings with a number of threaded cable connectors.

SUMMARY OF THE INVENTION

The invention thus addresses the problem of overcoming or mitigating at least one of the above-mentioned problems, and in particular a plug connector housing is to be provided in which the mounting of a threaded cable connector is simplified and at the same time contaminations in the cable outlet are avoided.

Here, the plug connector housing has at least one pre-equipped cable outlet for connecting a threaded cable connector and at least one closure for closing the at least one cable outlet. Here, the at least one cable outlet has a thread which forms a screw channel, and the plug connector housing has a predetermined breaking point in the transition to the closure.

In the present case, a pre-equipped cable outlet is understood to mean a region into which a threaded cable connector can be introduced, in particular screwed. The term pre-equipped is to be understood here to mean that the cable outlet is prepared to receive a threaded cable connector. Here, the cable outlet has an internal thread and the threaded cable connector has an external thread. Alternatively, the cable outlet has an external thread and the threaded cable connector has an internal thread. Here, the plug connector housing has at least one pre-equipped cable outlet of this type, preferably two or more pre-equipped cable outlets. The at least one cable outlet may be arranged here for example in the direction of a vertical axis of the plug connector housing and/or may be arranged inclined relative to this axis by a predetermined angle. Alternatively and/or additionally, a further cable outlet may be arranged in the direction of a horizontal axis of the plug connector housing and/or may be arranged inclined relative to this axis by a predetermined angle. In this embodiment as well the cable is introduced straight, i.e. without bending, into the plug connector housing. It is advantageous here that the plug connector housing can be used for all fields of application. The cable is not damaged on account of the fact that it is introduced into the plug connector housing straight, in spite of the angle of inclination.

The thread is preferably formed in the manner of an armored thread, a metric thread or an NPT thread (national pipe thread). Due to the thread, a screw channel is thus formed which is prepared to receive a thread of the threaded cable connector. The screw channel is therefore prepared to fasten the threaded cable connector in or to the cable outlet. Due to the threaded cable connector, a cable introduced thereinto is fixed, centered, thermally sealed and optimally relieved of tensile load. The associated electrical operating means are thus protected against mechanical influences and against dust and moisture. A threaded cable connector of this type is formed here preferably from metal or plastic. It preferably has an outer diameter from 5 mm to 100 mm, in particular 5 mm to 40 mm.

The threaded cable connector is introduced into the screw channel and is rotated or screwed in the direction of an interior space, i.e. the interior of the plug connector housing or in the direction of the closure. The interior of the plug connector housing serves here to receive the cable or cables introduced through the at least one cable outlet. The closure is arranged between the cable outlet and the interior of the housing in order to close the at least one cable outlet. The closure is thus located in the region of the cable outlet, in which the thread transitions to the interior of the plug connector housing. In the transition region, i.e. in the transition from the plug connector housing to the closure, the plug connector housing has a predetermined breaking point. A predetermined breaking point of this type is formed here in such a way that the closure when exposed to overload, i.e. under application of a predetermined force, is detached selectively and in a foreseeable manner from the plug connector housing. A predetermined force of this type is exerted here onto the predetermined breaking point as the threaded cable connector is turned or screwed in. The predetermined breaking point fails due to the fact that it has a thinner wall thickness compared with the plug connector housing. The thinner wall thickness is formed here for example by a notch or an incision.

Is advantageous here that no contamination or the like can infiltrate the cable outlet due to the closure and no additional tool is required in order to open the cable outlet. This may lead to a time saving, for example when mounting a number of threaded cable connectors in a plug connector housing. It is thus possible additionally to use the plug connector housing according to the invention anywhere.

In a preferred embodiment the closure is an integral part of the plug connector housing and/or is molded integrally on the plug connector housing. If the closure is an integral part of the plug connector housing, the plug connector housing and the closure are thus fabricated from one component. The closure and the plug connector housing thus form a unit. The predetermined breaking point is produced here for example by machining, in particular by turning, milling and/or cutting. Alternatively, the predetermined breaking point may also be produced directly, i.e. as a component formed jointly with the plug connector housing. For example, in the case of production by means of a casting method, material may thus be omitted at the predetermined breaking point already during the production process, i.e. a thinner wall thickness may be taken into consideration compared with the rest of the plug connector housing. The closure is integrally molded on the plug connector housing for example by heating the two components. Here, the cover and the plug connector housing are preferably formed from the same material.

In a further preferred embodiment the closure can be broken off by screwing the threaded cable connector into the screw channel in the plug connector housing. By screwing in said connector, a predetermined force is exerted by the threaded cable connector onto the closure. Here, the threaded cable connector contacts the closure first. If the threaded connector continues to be turned or screwed in the direction of the interior of the plug connector housing, a force acts on the closure. Due to the predetermined breaking point, which for example is formed as a notch, incision or as a thinner wall thickness compared to the wall thickness of the plug connector housing, the transition between closure and plug connector housing is weakened at precisely this point. The force application of the threaded cable connector thus causes the closure to be separated, detached and/or broken off from the plug connector housing. What is advantageous in this respect is that the cable is thus introduced into the plug connector housing without the use of any tools and in addition there is no need for any prior processing of the plug connector housing, in particular of the cable outlet.

The closure preferably has an inner side, which points into the interior of the plug connector housing, and an outer side, which is opposite the inner side. The closure protrudes via part of the outer side thereof into the screw channel and/or the part on the outer side of the closure forms a flange which protrudes into the screw channel. A closure of this type is circular here, for example. The outer side of the closure or of the flange is formed here for example substantially in a hollow-cylinder-like manner. Here, it is arranged in particular over the entire circumference of the closure. Due to the hollow-cylinder-like form, a ring face is formed which protrudes into the screw channel. The force exerted by the threaded cable connector onto the closure can be transferred uniformly to the predetermined breaking point via this ring face. For uniform force transfer, the closure may alternatively have a number of flanges, in particular two to fifty. Here, the flanges are arranged at a uniform distance from one another and preferably occupy 30% to 80% of the circumference of the closure. Here, material can advantageously be saved with simultaneous uniform force transfer.

In a further preferred embodiment the flange has a first side and a second side, which is opposite the first side, wherein the flange on the first side protrudes further into the screw channel than on the second side. The expression 'protrude further into the screw channel' is to be understood in the present case to mean that the flange on the first side has a height that is different compared to that on the second side. Here, the first side is higher than the second side. The height of the flange protruding into the screw channel is therefore uneven. The flange thus has different heights. Here, the height decreases evenly from the first side to the second side. It is advantageous here that, compared with a flange having a constant, uniform height, a weaker force has to be applied in order to break off the closure. Force is introduced initially when the threaded cable connector contacts the highest point of the flange, i.e. the first side. The force is thus initially transferred only to the point of the closure arranged in the axial extension between the first side of the flange and the interior of the plug connector housing. As the threaded cable connector is screwed in further, the closure breaks off bit by bit until it is ultimately completely separated from the housing. Alternatively, the second side may protrude further into the screw channel than the first side.

In a preferred embodiment the predetermined breaking point is substantially circular and lies approximately in the axial extension of the thread of the at least one cable outlet. A predetermined breaking point of this type is matched here to the thread in such a way that the force when the threaded cable connector is screwed in is transferred uniformly to the predetermined breaking point. Here, the predetermined breaking point is preferably formed as an indentation in the plug connector housing, in particular as a notch. The indentation is to be understood to mean any type of wall thickness that is thinner compared with the rest of the plug connector housing. Here, the indentation or notch extends in particular uniformly around the flange or flanges of the closure.

In a further preferred embodiment the cable outlet is closed by the closure in a dust-tight and water-tight manner. In particular due to the integral design or due to the integral molding of the closure, it is impossible for any contaminations, such as dust or water, to infiltrate the cable outlet. A disruption of the signals to be conducted by the introduced cable, a premature wear of the cable and/or a destruction are thus avoided.

The closure preferably can be broken off by turning in the threaded cable connector without the use of an additional tool. The closure is detached from the plug connector housing merely by turning in the threaded cable connector, i.e. by the force, in particular compressive force, generated by the threaded cable connector. The closure is thus detached or broken off without the use of tools.

In a preferred embodiment the plug connector housing at the predetermined breaking point has a thickness that corresponds approximately to 3% to 25% of the wall thickness of the plug connector housing. The force acting on the closure by the threaded cable connector as the threaded cable connector is turned in is thus alone sufficient to detach or break off the closure from the plug connector housing.

In a further preferred embodiment the predetermined breaking point is covered by the threaded cable connector once the closure has been broken off. The predetermined breaking point is thus arranged in such a way that it corresponds approximately to the circumference of the threaded cable connector. By resting the threaded cable connector on the plug connector housing or part thereof, the cable outlet is also closed in a water- and dust-tight manner once the closure has been broken off.

The flange preferably has a radially formed edge and/or via its outer edge penetrates the screw channel to approximately 20% to 50%, preferably 30% to 40%. An optimal force transfer from the threaded cable connector to the predetermined breaking point is given as a result of this embodiment of the flange.

Furthermore, a method for opening a cable outlet of a plug connector housing according to the invention is proposed in accordance with the invention. The method is characterized in that, by means of a threaded cable connector thread of a threaded cable connector, the threaded cable connector is pressed into a thread of the cable outlet against a flange of a closure and detaches the closure at the predetermined breaking point from the plug connector housing and opens the cable outlet.

The threaded cable connector here exerts a predetermined force onto the predetermined breaking point via the flange of the closure, such that this fails selectively. The closure is thus detached from the plug connector housing and thus separated from the plug connector housing. The cables arranged in the threaded cable connector may thus enter the plug connector housing.

In a preferred embodiment the method is characterized in that the cable outlet is to be opened without the use of an additional tool. The method according to the invention is characterized in that, in a particularly advantageous manner, solely the application of a force by screwing the threaded cable connector into the cable outlet is sufficient to detach the closure from the plug connector housing.

In a further preferred embodiment the method is characterized in that, following production, the at least one cable outlet is closed by the closure in a dust- and water-tight manner. This is attained for example in that the closure is substantially covered by the threaded cable connector. An infiltration of dust and/or water is thus prevented from infiltrating the plug connector housing by the threaded cable connector. Here, the threaded cable connector may have additional sealing means, such as O-rings, which prevent the infiltration of external influences.

DETAILED DESCRIPTION OF THE DRAWINGS

The figures contain simplified, schematic illustrations in part. Identical reference signs are used in part for like elements, which however might not be identical. Different views of the same elements could be differently scaled.

Figure 1:
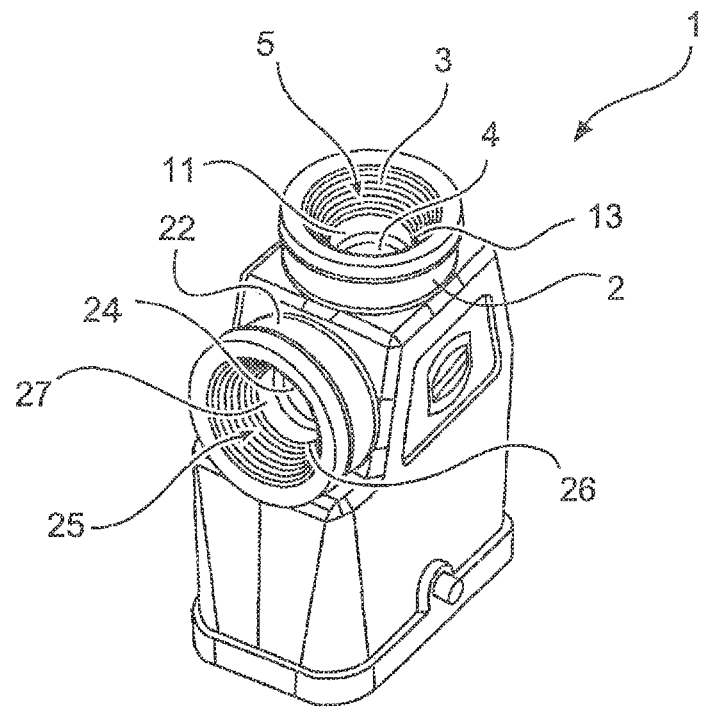
FIG. 1 shows an exemplary embodiment of a plug connector housing in a perspective view.

FIG. 1 shows a plug connector housing 1 in a perspective illustration. The plug connector housing 1 has a first cable outlet 2 and a second cable outlet 22. The first cable outlet 2 is arranged on the upper side of the plug connector housing and points vertically upwardly, and the second cable outlet 22 is arranged laterally on the plug connector housing 1. The first cable outlet 2 has an internal thread 3 as exemplary embodiment of a thread of the cable outlet 2, which forms a first screw channel 5. The first screw channel 5 is thus formed such that it can receive a threaded cable connector. At the lower end of the screw channel 5, i.e. between the first screw channel 5 and the plug connector housing 1, there is arranged a first closure 4. The first closure 4 has a hollow-cylindrical first flange 11 having a first ring face 13. The first ring face 13 is formed here such that it can be used to uniformly transfer to the predetermined breaking point the force exerted by a threaded cable connector to be inserted.

The second cable outlet 22 has a second screw channel 25, which is formed by a second internal thread 23. A second closure 24 is also arranged between the second cable outlet 22 and the plug connector housing 1 and has a hollow-cylindrical second flange 27 having a second ring face 26 directed into the second screw channel 25. Both the second cable outlet 22 and the second closure 24 are oriented here axially in the same direction.

Figure 2:
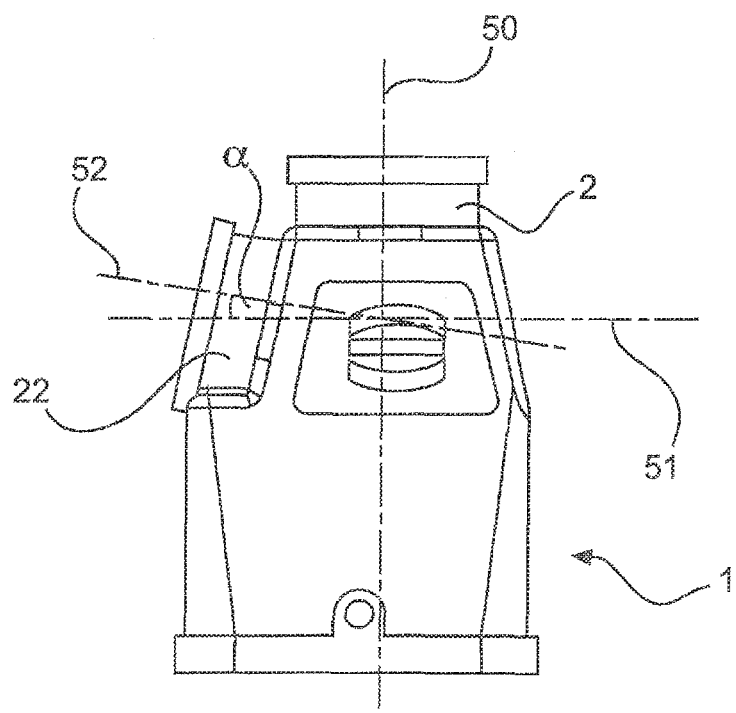
FIG. 2 shows the plug connector housing of FIG. 1 in a side view.

FIG. 2 shows the plug connector housing 1 from FIG. 1 in a side view. Here, it can be seen that the first cable outlet 2 extends vertically upwardly in the direction of the vertical axis 50. The second cable outlet 22 is arranged on the side of the plug connector housing 1. Here, the second cable outlet 22 is arranged inclined relative to the horizontal axis 51 by an angle α. The angle α here designates the angle between the horizontal axis 51 of the plug connector housing 1 and the local axis 52 of the second cable outlet 22. The cable to be introduced into the second cable outlet 22 is nevertheless introduced here into the plug connector housing 1 straight.

Figure 3:
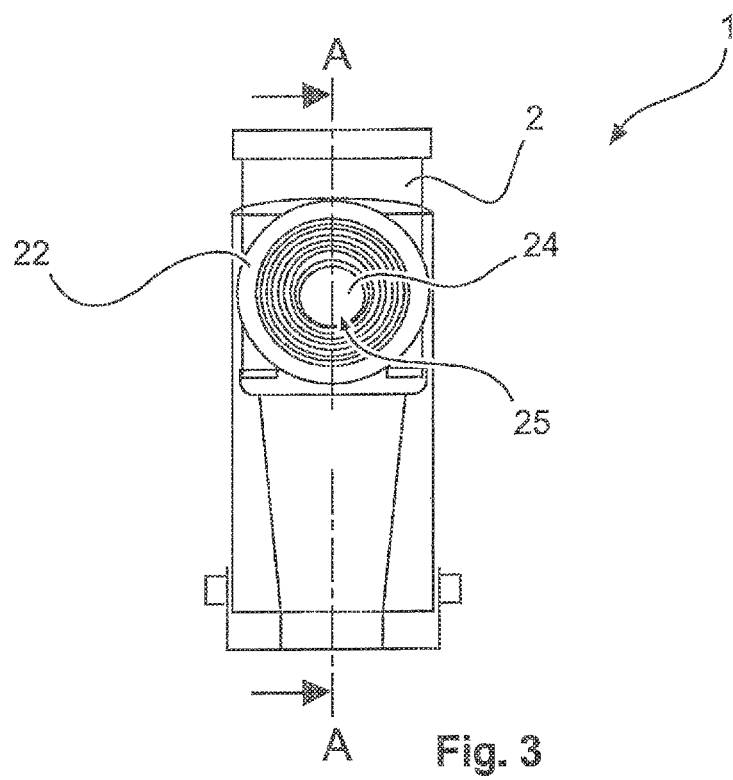
FIG. 3 shows the plug connector housing of FIG. 1 in a further side view.

FIG. 3 shows the plug connector housing 1 in a further side view, in which it can be seen that the second cable outlet 22 is arranged inclined relative to the horizontal axis of the plug connector housing 1 by an angle.

Figure 4:
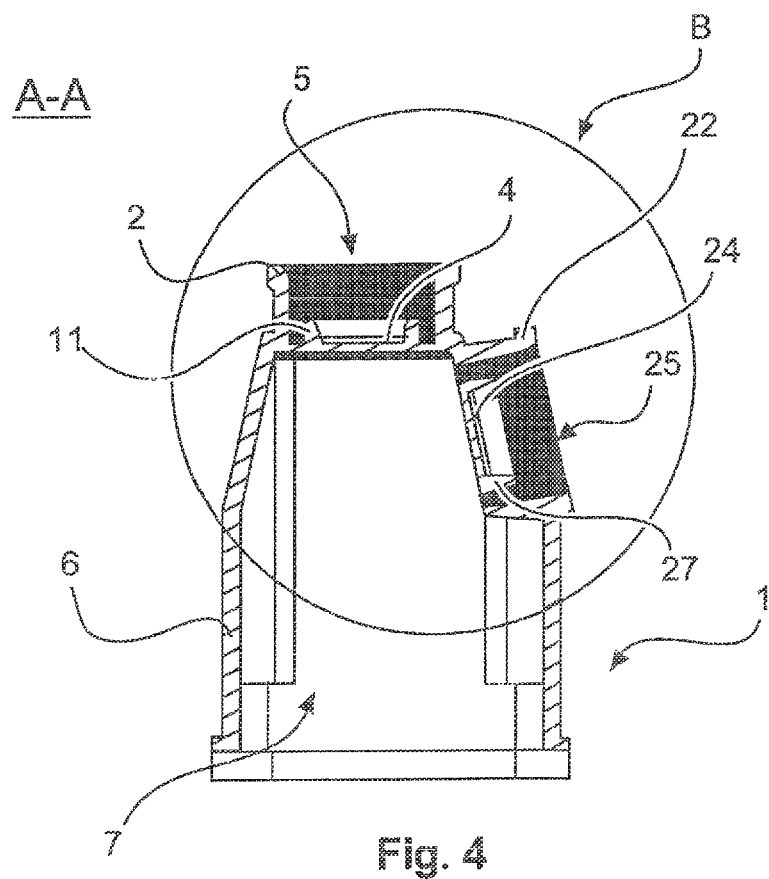
FIG. 4 shows the plug connector housing of FIG. 1 in a sectional view.

FIG. 4 shows a sectional view A-A of the plug connector housing 1 of FIG. 3. It can be seen herein that both the first closure 4 and the second closure 24 have a first flange 11 and a second flange 27 respectively, which protrude into the first screw channel 5 and second screw channel 25 respectively. Neither the first flange 11 nor second flange 27 has any material inside, such that the respective flanges 11 and 27 have a hollow-cylinder-like form. It can also be seen that the first closure 4 and the second closure 24 are arranged between the first cable outlet 2 and second cable outlet 22 respectively and the interior 7 of the plug connector housing 1. The interior 7 of the plug connector housing 1 is formed by a hollow space delimited by the plug connector housing wall 6. The cables introduced through the first cable outlet 2 and the second cable outlet 22 are received in the interior 7 of the plug connector housing 1.

Figure 5:
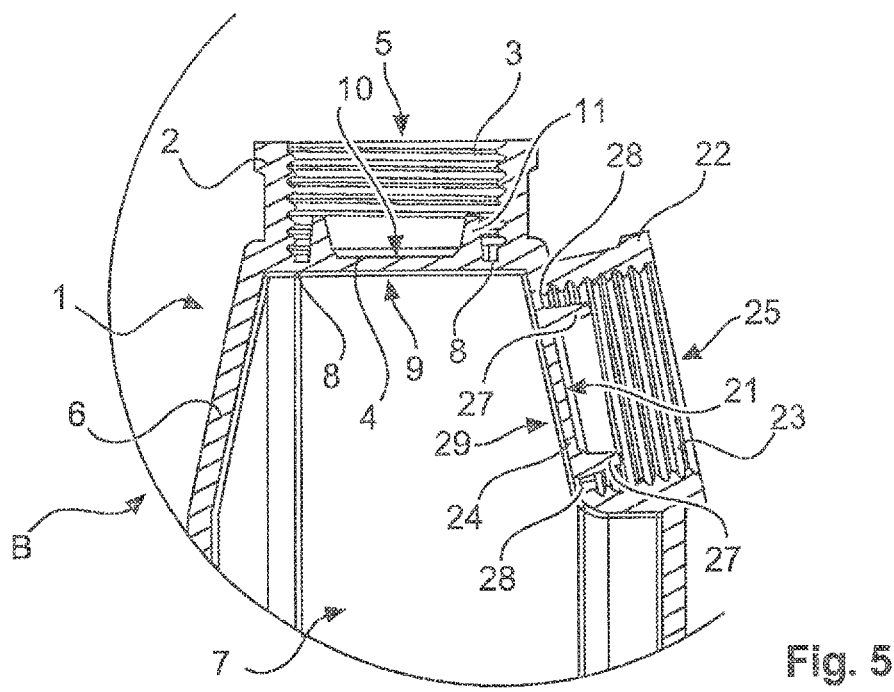
FIG. 5 shows a detail of the plug connector housing from FIG. 1.

FIG. 5 shows an enlarged detail B of FIG. 4. The detail B shows the first cable outlet 2 and the second cable outlet 22 and a portion of the plug connector housing 1. Here, it can be clearly seen that the first and second closures 4 and 24 have a first and second flange 11 and 27 respectively, which protrude into the first and second screw channels 5 and 25 respectively. The first closure 4 has a first inner side 9, which points into the plug connector housing 1. The first inner side 9 together with the plug connector housing wall 6 forms a flat, smooth surface. On the first inner side 9 there is thus no discernible difference between the plug connector housing wall 6 and the first closure 4. The second closure 24 has a second interface 29, which, similarly to the first inner side 9, points into the interior 7 of the plug connector housing 1. The second inner side 29 also forms a common surface with the plug connector housing wall 6. The first closure 4 and the second closure 24 additionally have a first outer side 10 and a second outer side 21 respectively, which are located opposite the first inner side 9 and second inner side 29 respectively. The first flange 11 and the second flange 27 are formed by part of the first outer side 10 and second outer side 21 respectively and protrude into the first screw channel 5 and second screw channel 25 respectively.

In addition, it can be seen in FIG. 5 that the plug connector housing 1, in the transition to the first and second closures 4 and 24, has a first and a second predetermined breaking point 8 and 28 respectively. Here, the first and second predetermined breaking points 8 and 28 are formed as notches arranged between the first flange 11 and the second flange 27 respectively and the plug connector housing wall 6. The respective notch has a thinner wall thickness compared with the wall thickness of the rest of the plug connector housing wall 6. A weakening of the material at this point has thus been intentionally provided in order to therefore selectively detach the first and second closures 4 and 24 respectively.

Figure 6:
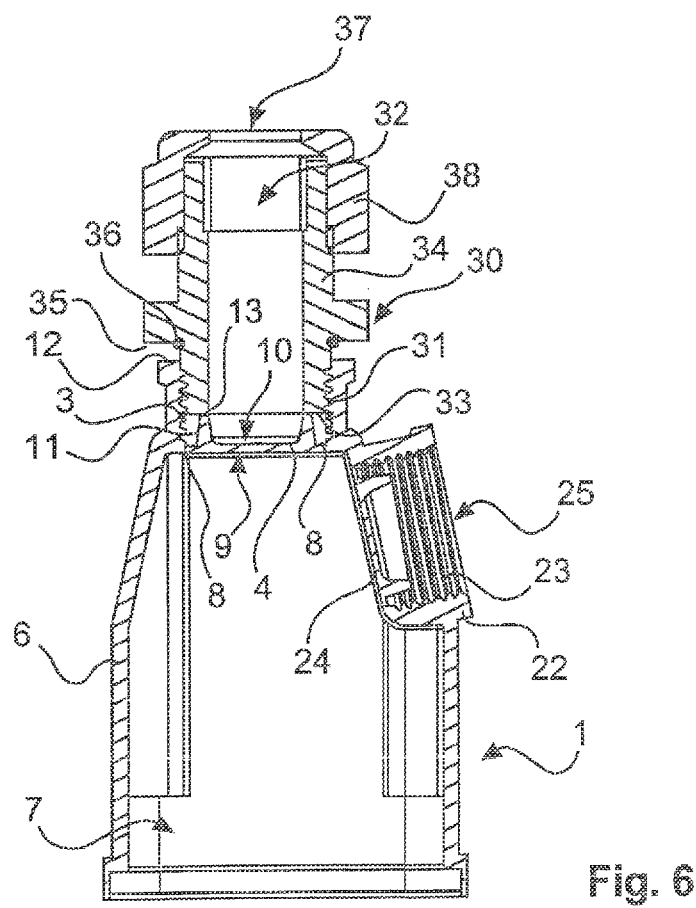
FIG. 6 shows an exemplary embodiment of a plug connector housing together with a threaded cable connector in a first position.

FIG. 6 shows a plug connector housing into which a threaded cable connector 30 has been screwed in part into the first cable outlet 2. The second cable outlet 22 does not have a threaded cable connector. The threaded cable connector 30 in the first cable outlet 2 is already screwed in to such an extent that a contact face 33 of the threaded cable connector 30 already rests on the first ring face 13 of the first flange 11 of the first closure 4. In order to screw the threaded cable connector 30 into the first cable outlet 2, the threaded cable connector 30 has a threaded cable connector thread 31, which engages with the first internal thread 3. In order to receive a cable, the threaded cable connector 30 has a hollow space 32, into which a cable can be introduced through an opening 37 and can be fastened in the threaded cable connector 30 using a fixing device 38. The hollow space 32 is delimited here by the external wall 34. The threaded cable connector 30 has a threaded cable connector bearing face 35, which rests on the cable outlet bearing face 12 when the threaded cable connector 30 has been screwed in accordingly. In order to attain a dust- and water-tight closure when the threaded cable connector 30 is completely screwed into the first cable outlet 2, a ring seal 36 is arranged between the threaded cable connector bearing face 35 and the external wall 34 of the threaded cable connector 30.

In FIG. 6 the threaded cable connector 30 already lies via the contact face 33 on the first flange 11 of the first closure 4. Here, the first closure 4 is still connected to the plug connector housing wall 6. In the illustrated position there is therefore not yet a large enough force exerted onto the first predetermined breaking point 8 in order to cause this to fail. The first closure 4 is therefore still fixedly connected to the plug connector housing wall 6.

Figure 7:
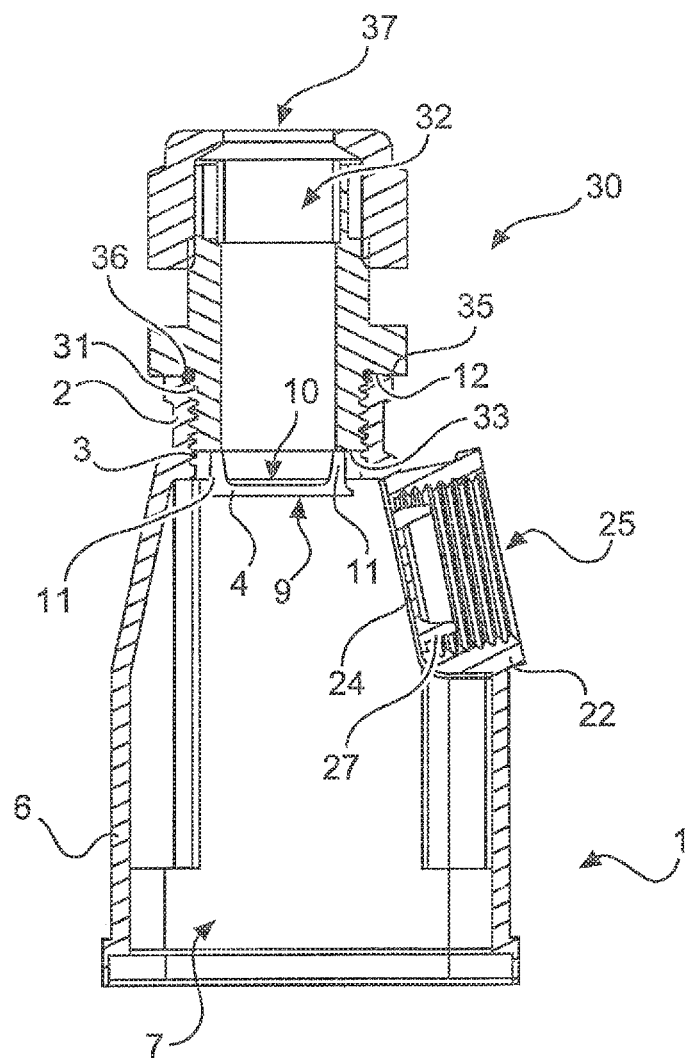
FIG. 7 shows the plug connector housing from FIG. 6 with the threaded cable connector in a second position.

FIG. 7 shows the threaded cable connector 30 in a second position. Here, the threaded cable connector 30 is screwed into the first cable outlet 2 to such an extent that the threaded cable connector bearing face 35 rests on the cable outlet bearing face 12. In order to seal against water and dust, the threaded cable connector 30 has a ring seal 36 at this point, i.e. between the threaded cable bearing face 35 and the cable outlet bearing face 12.

The force application of the threaded cable connector 30 onto the first closure 4 is already high enough in this position that the first closure 4 is detached from the plug connector housing 1. The first inner side 9 of the first closure 4 and the plug connector housing wall 6 no longer form a common surface. The first closure 4 breaks off or detaches here at the first predetermined breaking point 8 visible in FIG. 6. The force caused by screwing in the threaded cable connector was conducted from the contact face 33 onto the first ring face 13 of the first flange 4 uniformly to the first predetermined breaking point 8 (according to FIG. 6). Since the first predetermined breaking point 8 is formed as a notch, this has a thinner wall thickness at this point compared with the rest of the plug connector housing wall 6. By screwing in the threaded cable connector 20, a force was thus exerted selectively onto the first predetermined breaking point 8, which led to the predetermined failure of the first predetermined breaking point 8. The first closure 4 is thus detached or broken off without tools.

Figure 8:
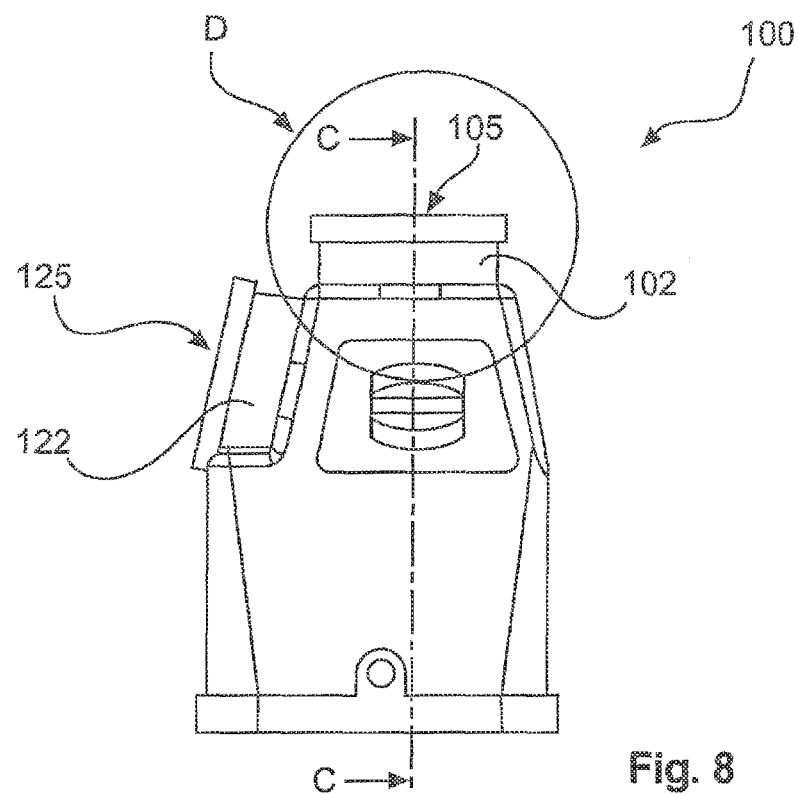
FIG. 8 shows a further exemplary embodiment of a plug connector housing in a side view.
Figure 9:
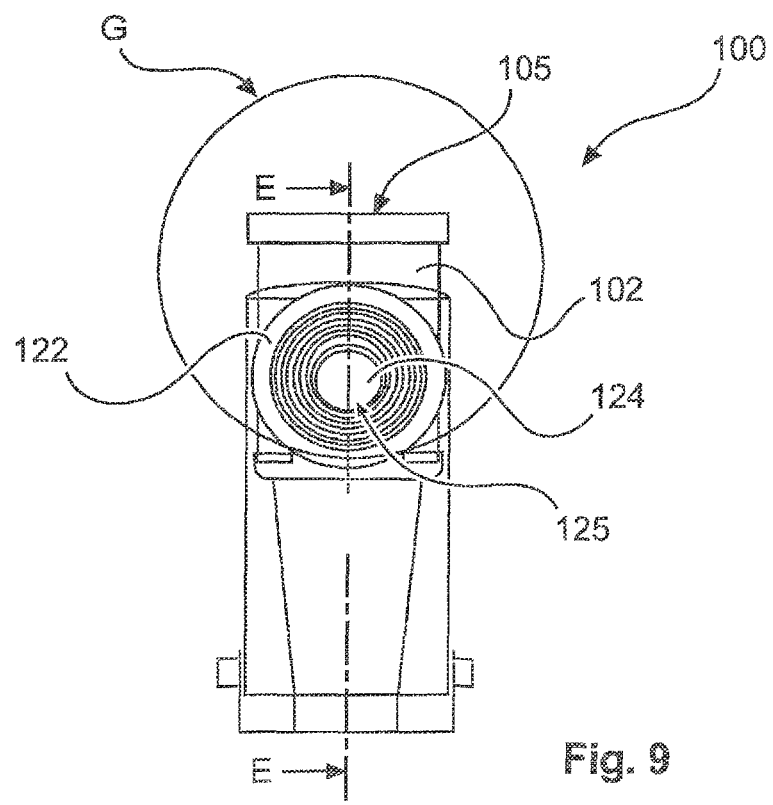
FIG. 9 shows the plug connector housing of FIG. 8 in a further side view.

FIGS. 8 and 9 show a further exemplary embodiment of a plug connector housing 100 in each case in a side view, which is constructed externally exactly the same as the plug connector housing 1 in the previous figures. Here, it has a first cable outlet 102 and a second cable outlet 122. The first cable outlet 102 has a first screw channel 105 and the second cable outlet 122 has a second screw channel 125. A second closure 124 can be seen additionally in FIG. 9.

Figure 10:
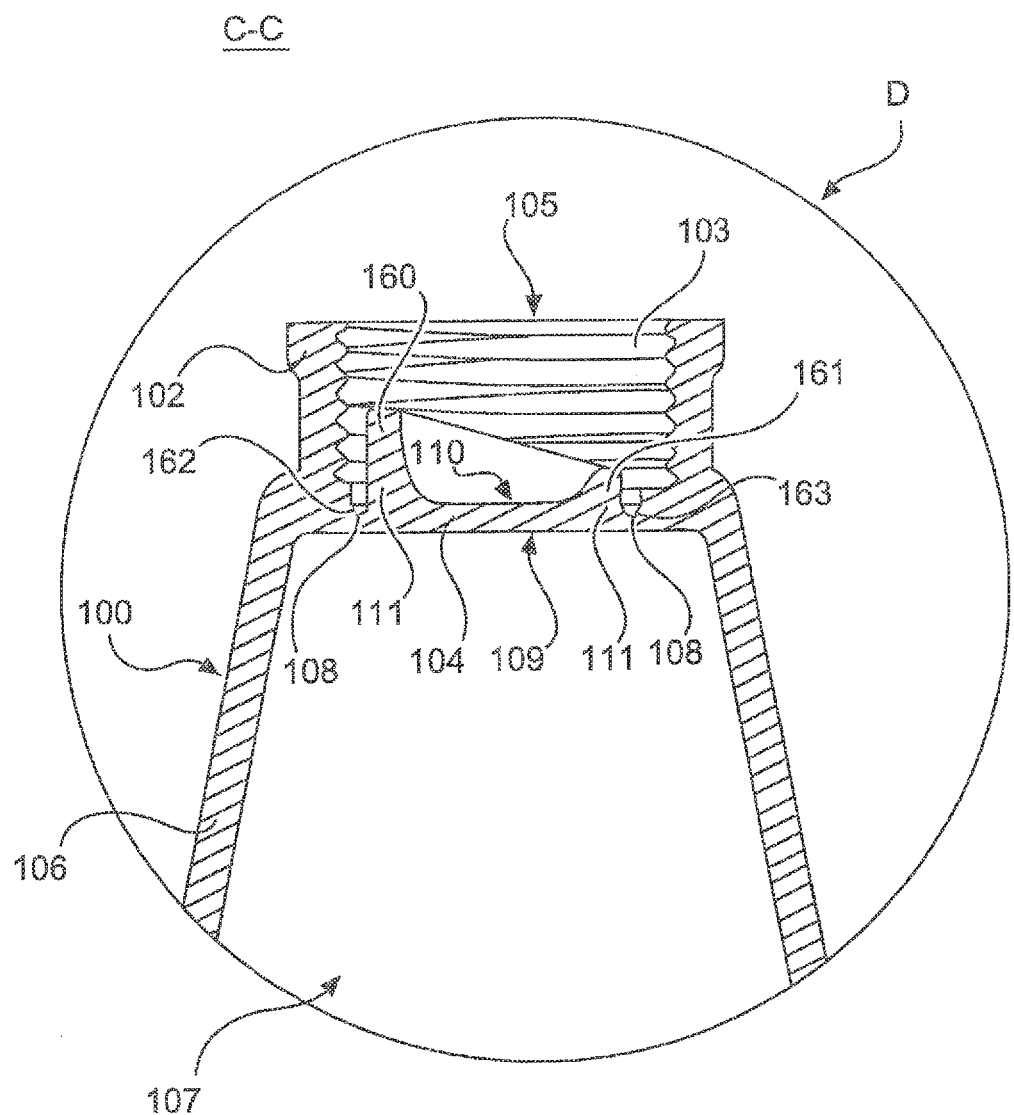
FIG. 10 shows a detail of the plug connector housing of FIG. 8 in a sectional view.

FIG. 10 shows an enlarged detail D of the section C-C of FIG. 8. Therein, the first cable outlet 102 of the plug connector housing 100 having a first internal thread 103 as exemplary embodiment of a thread can be seen. The first internal thread 103 forms a first screw channel 105. A first side 160 and a second side 161, which is opposite the first side 160, of a first flange 111, which is part of a first closure 104, protrude into the screw channel 105. The first closure 104 has a first inner side 109, which is directed into the interior 107 the plug connector housing 100. The interior 107 of the plug connector housing 100 is formed here by the plug connector housing wall 106. The first closure 104 also has a first outer side 110, which is arranged opposite the first in a side 109. The first flange 111 extends from the first outer side 110 in the direction of the first screw channel 105. The first side 160 of the first flange 111 here protrudes further into the first screw channel 105 than the second side 161 of the first flange 111. The first side 160 thus has a greater height than the second side 161.

The first closure, in the transition to the plug connector housing wall at 106, has a first predetermined breaking point 108, which approximately in its form is arranged around the first closure 104. A selective failure at this point is achieved as a result of the first predetermined breaking point 108.

What is advantageous in this embodiment is the fact that a weaker force has to be applied than with a flange formed at constant height. By screwing or turning a threaded cable connector into the first internal thread 103, the threaded cable connector firstly contacts the first side 160 of the flange 111. The force is thus transferred firstly to this point. The first predetermined breaking point 108 will therefore fail first at the first point 162, which is arranged in the axial extension between the first side 160 of the first flange 111 and the interior 107 of the plug connector housing 100. As the threaded cable connector is turned in further, the first closure 104 breaks off little by little from the plug connector housing wall 106. When the threaded cable connector reaches the second side 161, the first closure 104 likewise breaks off at the second point 163 and thus breaks off completely from the plug connector housing wall 106.

Figure 11:
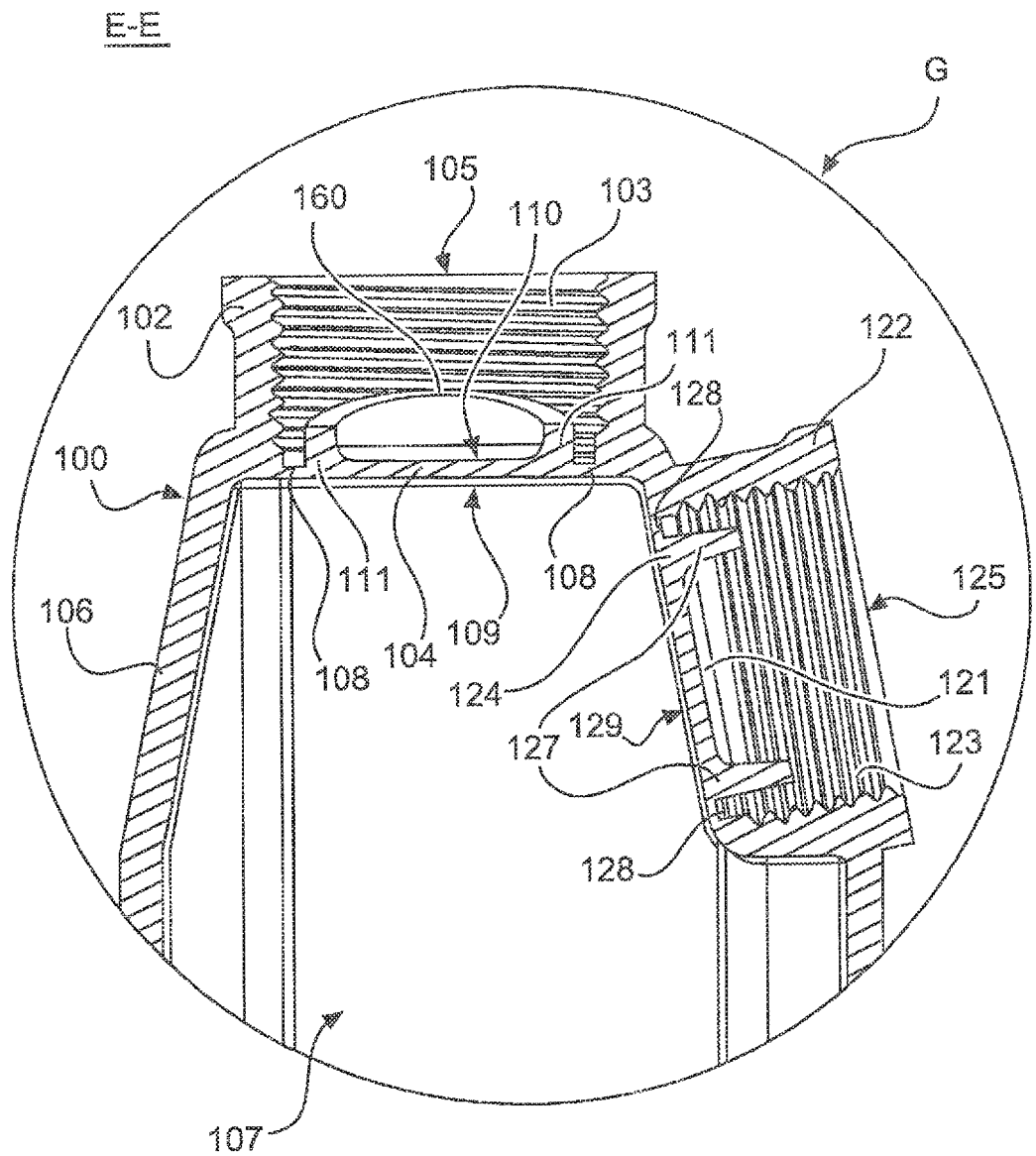
FIG. 11 shows a further detail of the plug connector housing of FIG. 8 in a sectional view.

FIG. 11 shows an enlarged detail G of the section E-E of FIG. 9. In FIG. 11, in addition to FIG. 10, the second cable outlet 122 can also be seen in a sectional view. In contrast to the first cable outlet 102, the second cable outlet, in the transition to the interior 107 of the plug connector housing 100, has a second closure 124, which has a second flange 127 at a constant height, i.e. protruding at each point to approximately the same extent into the second screw channel 125. In addition, it can additionally be seen in FIG. 11 that the first flange 111, starting from the first side 160, decreases evenly in height. The first side 160 thus protrudes highest or furthest into the screw channel 105 with respect to the overall first flange 111.

Figure 12:
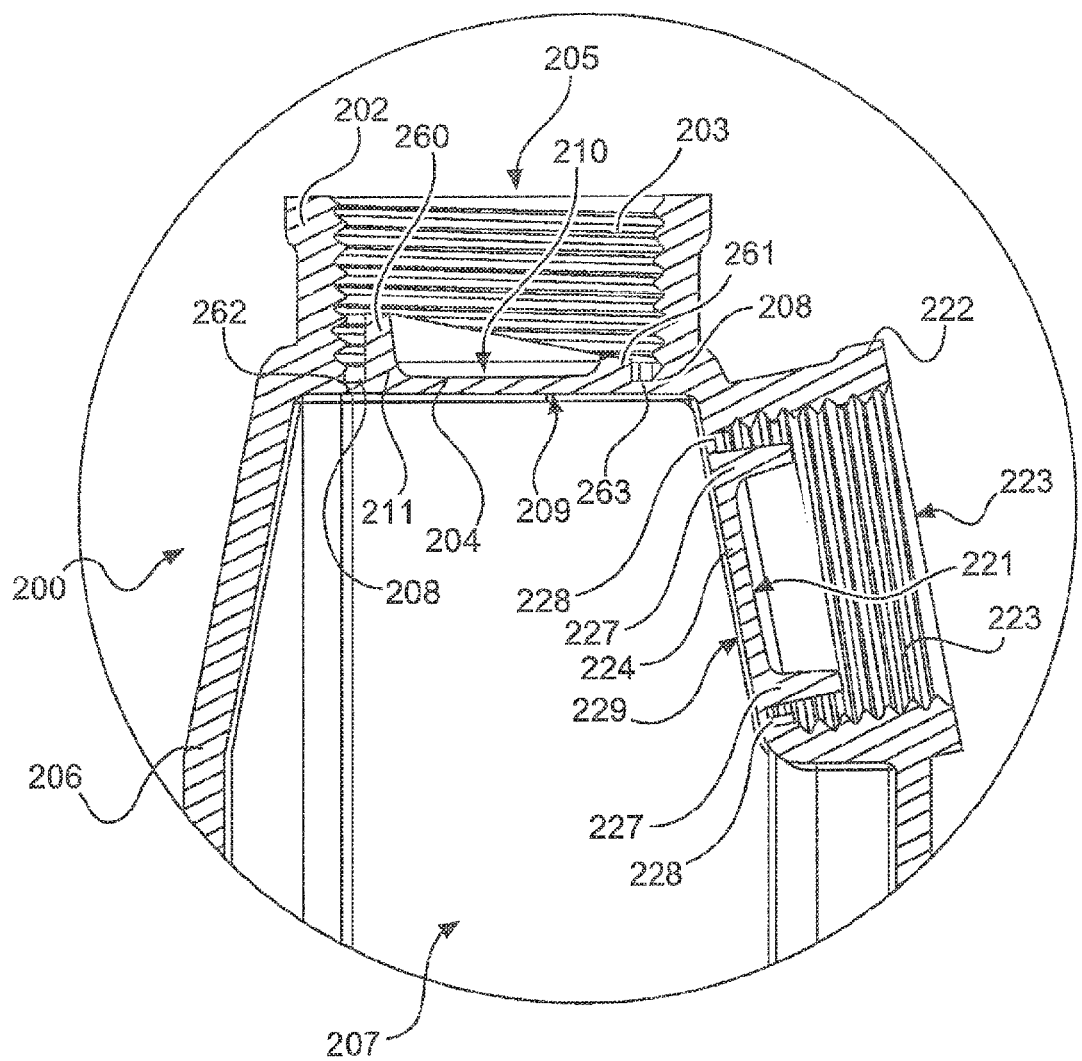
FIG. 12 shows a further exemplary embodiment of a plug connector housing in a detail of a sectional view.

FIG. 12 shows a plug connector housing 200 which has a first cable nutlet 202 and a second cable outlet 222. In contrast to the plug connector housing 100 of FIG. 11, the first closure 204 has the first side 260 and the second side 261 of the first flange 211 at a different point. In other words, the first side 260 is arranged at a different point compared with FIG. 11. The first flange 211 protrudes furthest into the screw channel 205, which is formed by the internal thread 203, on the first side 260. The first closure 204 is therefore firstly broken off from the plug connector housing wall 206 at the first point 262.

The plug connector housing 200 additionally also has a second channel outlet 222 having a second internal thread 223 forming a second screw channel 225. In addition, a second closure 224, which has a second inner side 229 and a second outer side 221, is located between the interior 207 and the second channel outlet 222. The second closure 224 has a circumferential second flange 227, which is of constant height. The second closure 224 will detach uniformly from the plug connector housing wall 206 at the second predetermined breaking point 228 when a threaded cable connector is screwed in.

Alternatively, The first internal thread 3, 103 or second internal thread 23, 123 illustrated in the above-mentioned figures is formed as an external thread. In an alternative embodiment of this type, the threaded cable connector thread is formed accordingly as an internal thread. The operating principle is the same here as in the illustrated figures. In other words, the closure here also has a predetermined breaking point that fails selectively as a result of the force applied by the threaded cable connector.

The invention claimed is:

1. A plug connector housing for protecting a plug connector, comprising:
   at least one pre-equipped cable outlet for connecting a threaded cable connector and
   at least one closure for closing the at least one cable outlet, wherein the at least one cable outlet has a thread, by which a screw channel is formed,
   the plug connector housing has a predetermined breaking point in a form of an indentation or notch extending uniformly around a flange of the closure in the transition to the closure, wherein the plug connector housing at the predetermined breaking point has a thickness which corresponds to approximately 3% to 25% of the wall thickness of the plug connector housing,
   wherein the closure has an inner side, which points into the interior of the plug connector housing, and an outer side, which is opposite the inner side, and the closure protrudes via part of the outer side thereof into the screw channel and the part on the outer side of the closure forms a flange, which protrudes into the screw channel, and
   wherein the flange has a first side and a second side which is opposite the first side, wherein the flange on the first side protrudes further into the screw channel than on the second side, whereupon when a threaded cable connector is screwed fully into the plug connector housing, the outlet closure is broken completely from the plug connector housing wall.

2. The plug connector housing as claimed in claim 1, wherein the closure is an integral part of the plug connector housing and/or is integrally molded on the plug connector housing.

3. The plug connector housing as claimed in claim 1, wherein the closure can be broken off by screwing the threaded cable connector into the screw channel of the plug connector housing.

4. The plug connector housing as claimed in claim 1, wherein the predetermined breaking point is substantially circular and lies approximately in the axial extension of the thread of the at least one cable outlet.

5. The plug connector housing as claimed in claim 1, wherein the cable outlet is closed by the closure in a dust- and water-tight manner.

6. The plug connector housing as claimed in claim 1, wherein the closure can be broken off by turning in the threaded cable connector without additional tools.

7. The plug connector housing as claimed in claim 1, wherein once the closure has broken off, the predetermined breaking point is covered by the threaded cable connector.

8. The plug connector housing as claimed in claim 1, wherein the flange has a radially formed edge and via its outer edge penetrates the screw channel to approximately 20% to 50% of the screw channel length.

9. The plug connector housing as claimed in claim 8, wherein the flange has a radially formed edge and via its outer edge penetrates the screw channel to approximately 30% to 40% of the screw channel length.

10. A method for opening a cable outlet of a plug connector housing as claimed in claim 1, wherein using a threaded cable connector thread of a threaded cable connector, the threaded cable connector presses into a thread of the cable outlet against a flange of a closure and detaches the closure at a predetermined breaking point from the plug connector housing and opens the cable outlet.

11. The method as claimed in claim 10, wherein the cable outlet can be opened without additional tools.

12. A method for producing a plug connector housing as claimed in claim 1, wherein following production, the at least one cable outlet is closed by the closure in a dust- and water-tight manner.

13. The plug connector housing as claimed in claim 2, wherein the closure can be broken off by screwing the threaded cable connector into the screw channel of the plug connector housing.

* * * * *